May 10, 1966     J. J. TAYLOR     3,250,171

SECURITY RIVET

Filed June 4, 1963

INVENTOR

JOHN J. TAYLOR

BY *Kenneth W. Miller*

ATTORNEY

United States Patent Office 3,250,171
Patented May 10, 1966

3,250,171
SECURITY RIVET
John J. Taylor, R.D. 4, County Road 44, Medina, Ohio
Filed June 4, 1963, Ser. No. 285,417
4 Claims. (Cl. 85—8.1)

This invention relates to suspension apparatus for transmission line conductors.

A principal object of the invention is to improve the reliability of suspension hardware in electrical transmission line apparatus.

A general object of the invention is to minimize conductor droppage due to wear and failure of suspension hardware.

In suspension apparatus for electrical transmission lines, various elements of hardware, pins, links, clevises, and the like, are utilized to couple and interconnect the conductor clamps, yoke plates, and strain clamps with the insulators and other hardware. Under certain conditions, particularly of vibration, the metal parts wear rapidly and the line conductors may be dropped to the ground. This represents a serious problem inasmuch as the conductors are energized at high voltages and may endanger human life. Additionally, the consequent interruption of service in the line represents a serious economic loss to the operating utility as well as to consumers.

The present invention relates to an improved pin for use in clevis-link connectors in suspension apparatus. As disclosed and described herein, the pin embodies a shank having one part thereof offset from the adjacent portions of the shank on each side thereof. The offset part of the pin functions as a stop to prevent sidewise movement of the pin under conditions of use. Accordingly, the pin will remain in place even though the cotter or the head of the pin are badly worn or are entirely destroyed.

The invention, together with further objects, features, and advantages thereof, will be understood from the following detailed specification and claims, taken in connection with the appended drawings in which:

Figure 2:
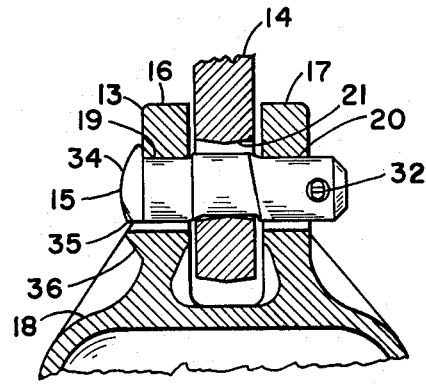
FIG. 2 is an enlarged view of a portion of one of the connectors of FIG. 1.
Figure 3:
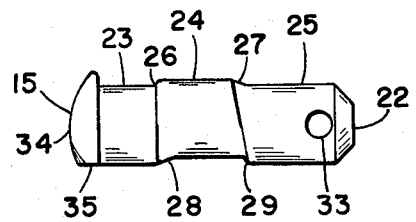
Figure 4:
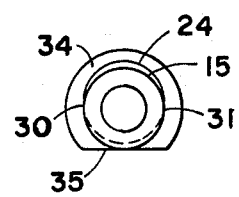
Figure 5:
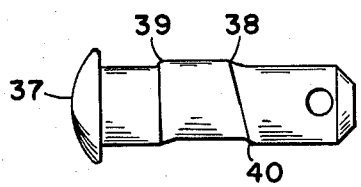
Figure 6:
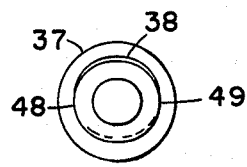
Figure 7:
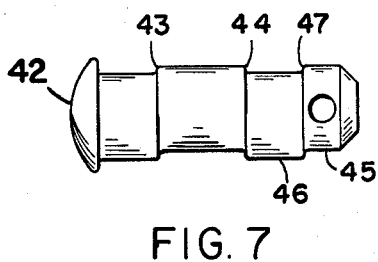

FIG. 3 and FIG. 4 particularly illustrate the suspension pin of FIG. 2;

FIG. 5 and FIG. 6 illustrate another embodiment of the pin of the invention; and FIG. 7 illustrates still another embodiment of the pin of the invention.

Figure 1:
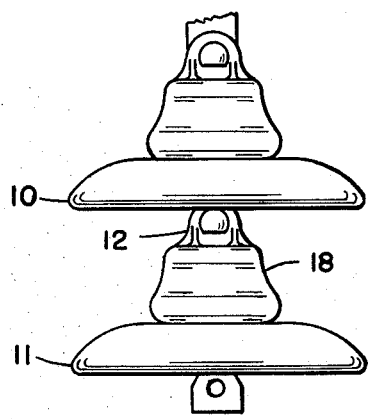
FIG. 1 is an elevation view of two suspension insulators embodying the invention.

Referring now to FIG. 1 and FIG. 2, there is shown transmission line apparatus embodying the apparatus of the invention and comprising two suspension insulators 10 and 11. The insulators 10 and 11 are connected together by a clevis-link connector 12 including a clevis 13 on the insulator 11, a link 14 on the insulator 10, and a pin 5 extending through the clevis and the link.

The clevis 13 comprises two clevis arms 16 and 17 which are formed as integral parts of the cap 18 of the insulator 11. The two arms 16 and 17 are spaced apart to receive the link 14 and have through openings 19 and 20 for receiving the pin 15. The link 14 comprises a flat end part of a terminal pin which is embodied in the insulator 10, as is known in the art. The link 44 is of generally rectangular cross section and has an opening 21 for receiving the pin 15. The walls of the opening 21 are formed with a slight double taper to improve the electrical and mechanical characteristics of the connector.

According to the invention, the pin 15 has a shank 22 formed in three parts, an inner or cap end part 23, a center part 24, and an outer end part 25. The center part 24 has substantially the same cross section as the end parts 23 and 25, but is displaced therefrom in one radial direction to define two exterior shoulders 26 and 27 on one side of the pin (also referred to as the top side of the pin) and two interior shoulders 28 and 29 on the remaining side of the pin (also referred to as the under side of the pin). The shoulders, as herein designated, are of substantially semi-cylindric extent, the exterior surface of the pin being substantially straight along transverse extremities of the pin, approximately as indicated at 30 and 31 in FIG. 4.

The pin 15 is received in the openings 19, 20 and 21 of the clevis arms and link respectively. The end parts 23 and 25 are so dimensioned that the exterior surfaces engage the clevis arms 16 and 17, and the center part 24 of the pin extends substantially between the interior surfaces of the arms. With this arrangement, tensive forces exerted between the two insulators 10 and 11 result in engagement of the pin with the walls of the openings 19 and 20 on the top surfaces of the end parts 23 and 25 and with the wall of the opening 21 on the under side of the center part 24. Accordingly, the shoulders 26 and 27 are disposed between the inside surfaces of the arms 16 and 17, and the link 14 is disposed between the shoulders 28 and 29.

The pin 15 is held against longitudinal movement by a cotter 32 which is received in an opening 33 in the shank 22 and constitutes a fastener means for the pin. The pen is held against rotational movement by the head 34 which has a flat surface 35 opposed to a shoulder 36 in the cap 18.

Because of the projection of the center part 24 of the pin in the direction of the link 14 from the adjoining surfaces of the end parts 23 and 25, the shoulders 26 and 27 are disposed in interference relation to the arms 16 and 17 adjacent the openings 19 and 20 and prevent transverse movement of the pin with respect to the clevis. Similarly, because of the recessed disposition of the center part 24 of the pin from the adjoining surfaces of the end parts 23 and 25, on the under side of the pin, the shoulders 28 and 29 are in interference relation to adjacent portions of the link 14 and prevent transverse movement of the pin with respect to the link. Since the link would engage the interior surfaces of the arms 16 and 17 if the pin were otherwise free to move in the axial direction of the pin, the recessed arrangement of the link in the rivet provides an additional stop means for the rivet. Because of the mutual disposition of the rivet, the clevis arms, and the link, and the two stop functions provided thereby, the pin is secured against escape from the openings and the parts are maintained in locking relationship, even though the cotter 32 or the head 35 become worn or completely destroyed.

The pin 15 may be formed from a straight pin by a suitable operation in which the center part 24 is displaced from the body of the shank. The pin may be made from rod stock by forcing and upsetting operations at suitable temperatures, as is known in the art. Forming dies may be used for shaping the inclined shoulder portions as, e.g., the shoulders 27 and 29 of the pin 15.

In the embodiment of FIG. 5, the pin 37 has the shoulder 38 formed with a relatively gradual change, in proceeding from the outer end of the pin toward the head, to facilitate insertion of the pin into and through the openings 19, 20 and 21. Conversely, the shoulders 39 and 40 are formed as relatively abrupt changes in the exterior surface of the pin to facilitate the stop-lock action.

In the pin 15 in FIG. 3 and the pin 37 in FIG. 5, the shoulders 27 and 29 and the shoulders 38 and 40, of the respective pins, are inclined from the perpendicular so that the exterior shoulders are a greater distance from the outer end of the pin than are the interior shoulders. This facilitates insertion of the pin into the openings 19, 20 and 21, as described in connection with the tapered progression of the shoulders. In the embodiment of FIG. 7, the pin 42 has the planes of the shoulders 43 and 44 perpendicular to the longitudinal axis of the pin to facilitate manufacture.

The pin 42 of FIG. 7 embodies an end part 45 which is offset with respect to the shank part 46 and defines an interior shoulder 47. The shoulder 47 cooperates with the exterior of the clevis arm 17 to constitute a third interference relation between the pin and the clevis arms. The offset end part 45 may be incorporated in any of the pins 15, 34 and 37 within the spirit of the invention, or may be used with an otherwise straight shank so that the shoulder 47 constitutes the only retaining part of the connector.

The invention may be practiced by utilizing non-circular cross sections in any of the parts 23, 24 and 25.

It is to be understood that the foregoing description is not intended to restrict the scope of the invention and that various rearrangements of the parts and modifications of the design may be resorted to. The following claims are directed to combinations of elements which embody the invention or inventions of this application.

I claim:

1. An improved pin for interconnecting an apertured link between spaced apertured clevis arms in an insulator clevis-link assembly comprising an elongated shank having a discontinuous axially extending peripheral surface forming an interlocking seat and stop lock for the apertured walls of the link and clevis arms, respectively, said shank including axially spaced surface portions having a common longitudinal axis and having substantially axially aligned external peripheral surfaces, an integral axial portion of the shank intermediate said axially spaced surface portions being radially offset from and having its longitudinal axis displaced radially from the longitudinal axis of said axially spaced surface portions to form a recessed axial surface parallel to said common longitudinal axis and defining spaced abrupt shoulders of crescent shaped cross section which extend substantially to the medial portion of the pin, at least one of which is approximately right angular, for seating the apertured wall of the link and a circumferentially displaced radially projecting axial surface parallel to and diametrically opposed to said recessed surface defining spaced abrupt shoulders of crescent shaped cross section which extend substantially to the medial portion of the pin, at least one of which is approximately right angular, for engaging and abutting the apertured walls of the spaced clevis arms in opposed stop-lock relation therewith, the leading edge of the shoulders facing the free end of the pin during movement in an axial direction through the apertures in clevis arms and link being slightly sloped to facilitate insertion of the pin through the clevis arms and link, the axial lengths of the spaced axial portions and said intermediate portion engaging said apertures each being about the same and each of said portions having peripheral surfaces parallel to the axis of the pin for substantially the entire length of said portion, a head at one extremity of said shank and securing means at the remaining end of said shank.

2. A pin in accordance with claim 1 in which the head on the shank is provided with a flat on one side thereof tangentially disposed with respect to said shank.

3. An improved pin for interconnecting an apertured link between spaced apertured clevis arms in an insulator clevis-link assembly comprising an elongated shank having a discontinuous axially extending peripheral surface forming an interlocking seat and stop lock for the apertured walls of the link and clevis arms, respectively, said shank including axially spaced surface portions having a common longitudinal axis and having substantially axially aligned external peripheral surfaces, an integral axial portion of the shank intermediate said axially spaced surface portions being radially offset from and having its longitudinal axis displaced radially from the longitudinal axis of said axially spaced surface portions to form a recessed axial surface parallel to said common longitudinal axis and defining spaced abrupt shoulders of crescent shaped cross section which extend substantially to the medial portion of the pin, at least one of which is approximately right angular, for seating the apertured wall of the link and a circumferentially displaced radially projecting axial surface parallel to and diametrically opposed to said recessed surface defining spaced abrupt shoulders of crescent shaped cross section which extend substantially to the medial portion of the pin, at least one of which is approximately right angular, for engaging and abutting the apertured walls of the spaced clevis arms in opposed stop-lock relation therewith, the axial lengths of the spaced axial portions and said intermediate portion engaging said apertures each being about the same but in which the axial displacement of the shoulders adjacent the recessed axial surface is greater than the axial displacement of the shoulders formed by the radially projecting axial surface, and each of said portions having peripheral surfaces parallel to the axis of the pin for substantially the entire length of said portion, a head at one extremity of said shank and securing means at the remaining end of said shank.

4. A pin in accordance with claim 3 in which the head on the shank is provided with a flat on one side thereof tangentially disposed with respect to said shank.

References Cited by the Examiner

UNITED STATES PATENTS

| | | | |
|---|---|---|---|
| 111,515 | 2/1871 | Clark | 16—168 |
| 268,785 | 12/1882 | Duling | 59—86 X |
| 435,511 | 9/1890 | McCurdy | 294—82 |
| 508,258 | 11/1893 | Taplin | 74—251 |
| 679,889 | 8/1901 | Dorn | 59—86 X |
| 922,605 | 5/1909 | Lenahan | 16—168 |
| 1,010,920 | 12/1911 | Kenney | 174—161 X |
| 1,208,422 | 12/1916 | Way | 16—169 X |
| 1,557,172 | 10/1925 | Klein et al. | 74—254 |
| 2,075,082 | 3/1937 | Barrow | 174—150 X |
| 2,266,693 | 12/1941 | Weber | 16—169 X |
| 2,484,759 | 10/1949 | Starr | 287—100 |
| 2,525,194 | 10/1950 | Anderson et al. | 59—86 |
| 2,743,895 | 5/1956 | Tygh | 287—100 X |
| 2,809,856 | 10/1957 | Alexander | 287—100 |

FOREIGN PATENTS

| | | |
|---|---|---|
| 631,172 | 9/1927 | France. |
| 656,779 | 2/1938 | Germany. |
| 422,613 | 6/1947 | Italy. |

CARL W. TOMLIN, *Primary Examiner.*

THOMAS F. CALLAGHAN, *Examiner.*

A. V. KUNDRAT, *Assistant Examiner.*